Feb. 28, 1956  H. E. TEMPLE  2,736,418
CONVEYOR SYSTEM WITH ARTICLE SPACING APPARATUS
Filed June 5, 1952  5 Sheets-Sheet 1

Fig.1

INVENTOR:
HIRAM E. TEMPLE
BY HIS ATTORNEYS
HARRIS, KIECH, FOSTER & HARRIS

Feb. 28, 1956   H. E. TEMPLE   2,736,418
CONVEYOR SYSTEM WITH ARTICLE SPACING APPARATUS
Filed June 5, 1952   5 Sheets-Sheet 5

INVENTOR:
HIRAM E. TEMPLE
BY HIS ATTORNEYS
HARRIS, KIECH, FOSTER & HARRIS

United States Patent Office 2,736,418
Patented Feb. 28, 1956

2,736,418

CONVEYOR SYSTEM WITH ARTICLE SPACING APPARATUS

Hiram E. Temple, San Gabriel, Calif., assignor to Read Standard Corporation, a corporation of Delaware Application June 5, 1952, Serial No. 291,895

16 Claims. (Cl. 198—31)

The present invention relates in general to conveyor systems and, more particularly, to a conveyor system having associated therewith an article spacing apparatus for disposing articles on a conveyor in spaced relation, this application being a continuation-in-part of my application Serial No. 253,525, filed October 27, 1951. While the invention finds particular utility in the baking industry for handling such articles as baking pans or pan straps, for example, and is considered hereinafter in such connection as a matter of convenience, it will be understood that the invention is also susceptible of other applications and that I do not intend to be limited to the specific applications considered hereinafter.

In general, a primary object of the invention is to provide a conveyor system which includes means for approximately uniformly spacing a series of articles on a conveyor, and which includes means for subsequently spacing the articles apart accurately. In other words, the primary object of the invention is to provide an apparatus which first produces a coarse spacing of the articles, and which thereafter produces a fine spacing thereof.

More particularly, an object of the invention is to provide an apparatus which includes a conveyor, means for delivering a series of spaced articles to the conveyor, a plurality of stops spaced apart along the conveyor and movable from retracted to extended positions to intercept the respective articles in the series, and means operating in timed relation with the conveyor for extending the stops so as to intercept the respective articles in the series, these stops being extended seriatim.

Another object is to provide a conveyor system of the foregoing character wherein the means for extending the stops includes cam means operating in timed relation with the conveyor and engageable with switches connected to the respective stops, the latter being electrically operable.

Another object is to provide an apparatus which includes an inlet conveyor having upstream and downstream sections, means for driving the downstream section at a higher speed than the upstream section, and escapement means in the path of the downstream section for passing one article at a time, the downstream section spacing each article passed by the escapement means from a following article by virtue of the higher speed of the downstream section. This structure provides a means for at least approximately uniformly spacing the articles apart, which is an important feature of the invention. After being spaced apart at least approximately uniformly in this manner, the articles are delivered to an outlet conveyor having the elements hereinbefore discussed for accurately spacing the articles.

Another object is to provide an actuating means for the escapement means which is operated periodically a predetermined number of times, equal to the number of articles desired in the series, by a control means operating in timed relation with the conveyor system. More particularly, an object is to provide an electrically operable or electrically controlled actuating means for the escapement means and to provide a cam means operating in timed relation with the conveyor system and engageable with a switch which is connected to the actuating means.

Another object is to provide means for transferring laterally from the conveyor with which the stops are associated a series of articles intercepted by the stops, and to provide means operating in timed relation with the conveyor system for energizing the article-transferring means upon interception of the series of articles by the stops. A related object is to provide an electrically operable article-transferring means and to provide cam means operating in timed relation with the conveyor system and engageable with a switch connected to the article-transferring means.

As an example, the conveyor along which the stops are spaced may be located in front of and extend transversely of an oven into which pans, or pan straps, of dough to be baked are to be loaded. In such an event, the article-transferring means transfers the articles laterally from the conveyor along which they are spaced by the stops into the oven.

The foregoing objects and advantages of the present invention, together with various other objects and advantages thereof which will become apparent, may be attained with the exemplary embodiment of the invention which is described in detail hereinafter and which is illustrated in the accompanying drawings. Referring to the drawings.

Figure 1:
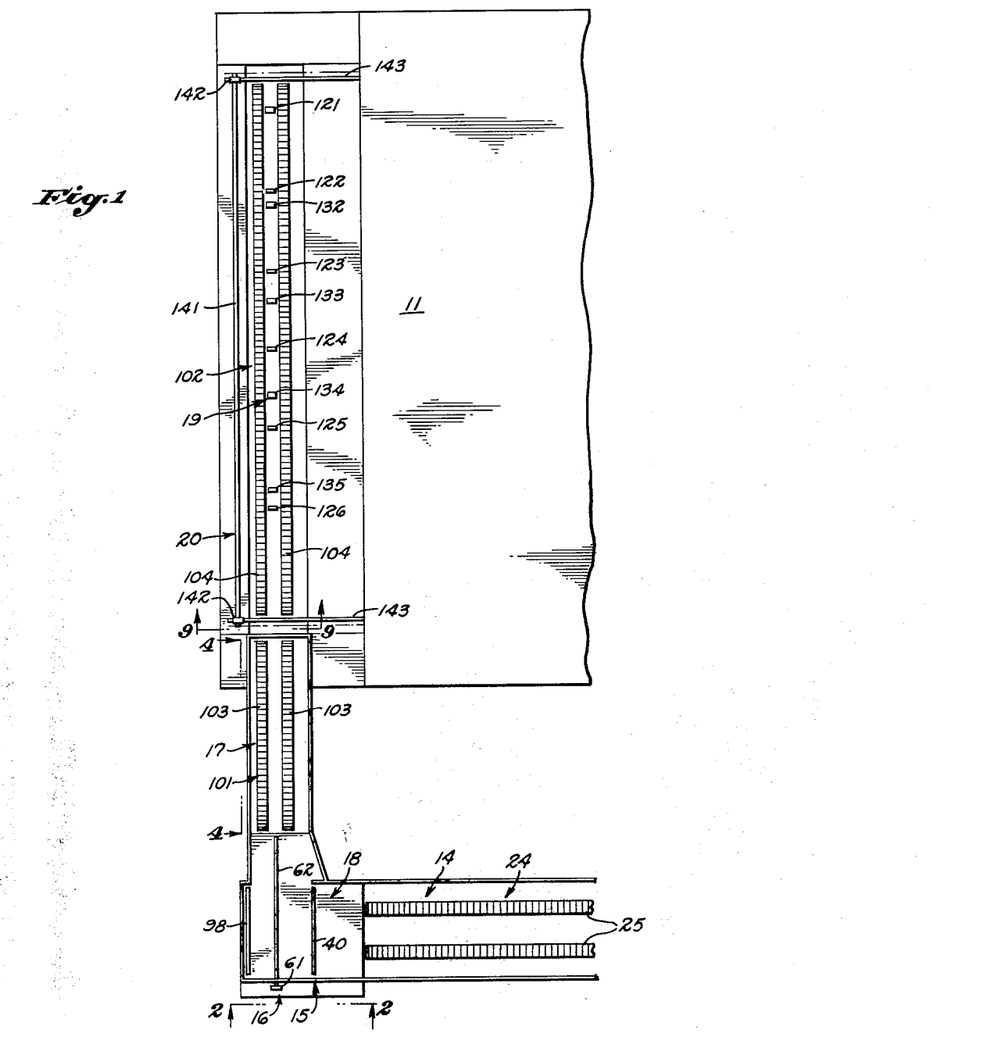
Fig. 1 is a semidiagrammatic plan view of a conveyor system which embodies the invention.

Referring first to Fig. 1 of the drawings, the invention is illustrated therein as embodied in a conveyor system for delivering dough-filled baking pans, or pan straps, to the inlet end of a baking oven 11 and for loading them onto a conveyor means, not shown, within the oven in the form of ranks extending transversely of such conveyor means, the conveyor system of the invention being considered hereinafter as handling pan straps since it is conventional in the baking industry to secure several baking pans together in spaced relation to form a pan unit or strap. However, while the invention is being considered herein in connection with the baking industry, it will be understood that other applications of the invention are possible, the one elected for consideration herein being illustrative only.

Considering the structure and operation of the conveyor system of the invention in a general way, it includes an inlet conveyor 14 which receives dough-filled pan straps in single file from a suitable source, not shown, and which conveys the file of pan straps to an escapement means 15, the latter passing one pan strap at a time to a transfer means 16 which, in the particular construction illustrated, transfers successive pan straps laterally onto an outlet or loader conveyor 17. As will be discussed in more detail hereinafter, the escapement means 15 and the transfer means 16 cooperate with a downstream section 18 of the inlet conveyor 14 to deliver the pan straps to the loader conveyor 17 in spaced relation with at least approximately uniform spacing between the pan straps. Associated with the loader conveyor 17 is a spacing means 19 which accurately spaces the pan straps apart in front of the oven 11, the spacing means 19 and the spacing means provided by the downstream section 18 of the inlet conveyor 14 being adjustable to space pan straps of different sizes in a manner to be described. Operating transversely of the loader conveyor 17 is a loading means or loader 20 for transferring the spaced pan straps from the loader conveyor to the conveyor means within the oven 11, each group of pan straps transferred into the oven in this manner forming a rank of spaced pan straps which extends transversely of the oven.

Figure 2:
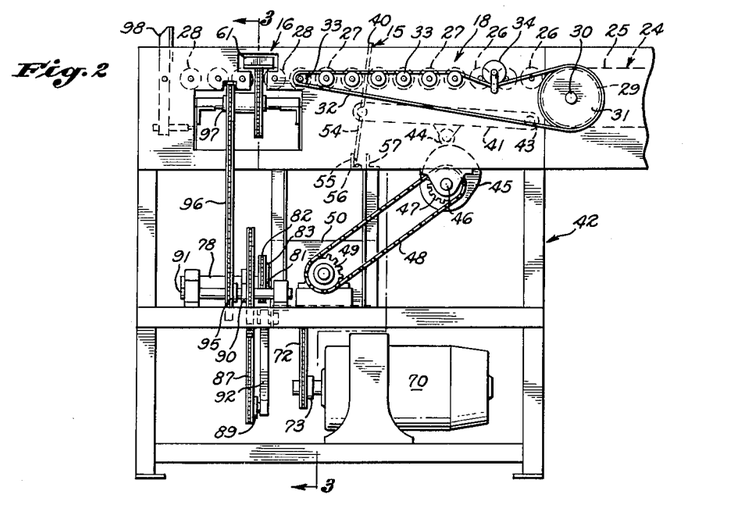
Fig. 2 is an enlarged elevational view taken as indicated by the arrowed line 2—2 of Fig. 1.

Considering the conveyor system of the invention in detail, the inlet conveyor 14, as best shown in Fig. 1, includes an upstream section 24 which comprises two endless conveying elements 25 on which the pan straps rest. Referring now to Fig. 2, the downstream section 18 of the inlet conveyor 14 includes idling rolls 26, driven rolls 27 and idling rolls 28 arranged in the order recited from the upstream end of the conveyor section 18 to the downstream end thereof. The conveying elements 25 of the conveyor section 24 are trained around sprockets 29 fixed on a shaft 30, the latter also having fixed thereon a sprocket 31. The sprocket 31 drives the driven rolls 27 through a chain 32 which is trained around the sprocket 31 and is trained over sprockets 33 respectively connected to the driven rolls, the chain 32 also being trained around an idling sprocket 34. Thus, it will be seen that the conveyor section 18 and the conveyor section 24 operate in timed relation since the latter drives the former in the manner described. However, the diameters of the sprockets 29, the sprocket 31, the sprockets 33 and the driven rolls 27 are so related that the peripheral speeds of the driven rolls are higher than the linear speeds of the conveying elements 25. In other words, the conveyor section 18 conveys the pan straps at a higher speed than does the conveyor section 24. The result of this is that the conveyor section 18 serves to space each pan strap from a following pan strap as it is passed by the escapement means 15, the pan straps passed by the escapement means and transferred to the loader conveyor 17 by the transfer means 16 thus being spaced apart at least approximately uniformly because of the spacing action of the conveyor section 18, which is an important feature of the invention.

Considering the escapement means 15, it includes a gate 40 which is disposed between two of the driven rolls 27 and which is movable between an extended position wherein it intercepts a pan strap on the inlet conveyor 14 and a retracted position wherein it is disposed below the conveyor surface defined by the driven rolls 27 to pass one pan strap to the transfer means 16. The gate 40 is pivotally mounted on an arm 41 which is pivotally connected to a frame 42 at 43. The arm 41 carries a cam follower 44 which engages a cam 45 for moving the gate 40 between its extended and retracted positions, this cam being fixed on a shaft 46 having fixed thereon a sprocket 47 for rotating the shaft. The sprocket 47 is driven by a chain 48 trained therearound and around an output sprocket 49 on a gear box 50. The manner in which the gear box is driven will be discussed hereinafter.

Depending from the gate 40 is a latch element 54 which is engageable with a latch element 55 carried by the frame 42 when the gate is in the position shown in Fig. 2 of the drawings, the gate normally being biased into this position by a spring, or the like, not shown. Thus, as the cam 45 rotates, if no pan strap is bearing against the gate 40, the gate does not move into its retracted position, being restrained from doing so by engagement of the latch element 54 with the latch element 55. Even if a pan strap engages the gate 40 after the cam 45 has disengaged the cam follower 44, the latch elements 54 and 55 prevent retraction of the gate until such time as the cam 45 completes its cycle, disengagement of the latch element 54 from the latch element 55 when a pan strap engages the gate 40 after the cam 45 has disengaged the cam follower 44 being prevented by a hook or lip 56 on the latch element 55. However, if a pan strap is bearing against the gate 40 when the cam 45 rotates into a position to permit the gate to drop toward its retracted position, the pressure of the pan strap against the gate rotates the gate and the latch element 54 into a position such that the latch element 54 clears the latch element 55, whereupon the gate drops as the cam rotates to permit the pan strap to pass, such rotation of the gate relative to the arm 41 being limited by a stop member 57. Thus, the action of the latch means formed by the latch elements 54 and 55 serves to prevent passing of a pan strap except at the proper point in the operating cycle of the apparatus, thereby insuring passing of pan straps in time relation with the operation of the transfer means 16, as will be described hereinafter. The escapement means 15 is disclosed and claimed in my copending application Serial No. 253,525, filed October 27, 1951.

Figure 3:
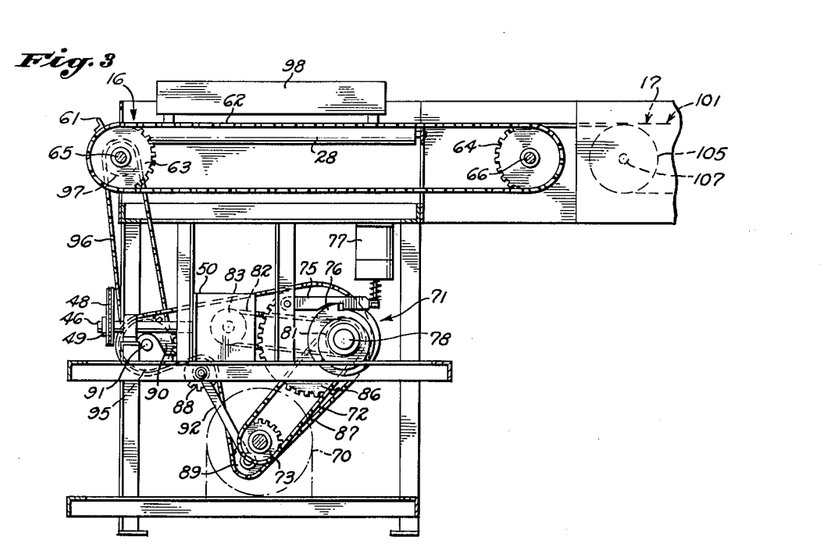
Fig. 3 is a sectional view taken as indicated by the arrowed line 3—3 of Fig. 2.

The transfer means 16, as best shown in Figs. 2 and 3 of the drawings, includes a sweep 61 which is carried by a chain 62 trained around sprockets 63 and 64 fixed on shafts 65 and 66. The chain runs between two of the idling rolls 28 and at a level slightly below the conveyor surface defined by such rolls, only the sweep 61 being above the idling rolls 28 during the upper run of its movement. Thus, each time the sweep 61 completes one cycle, it transfers one pan strap from the inlet conveyor 14 to the loader conveyor 17, assuming that a pan strap has been passed by the escapement means 15.

Considering the drive for the escapement means 15 and the transfer means 16, it includes an electric motor 70, hereinafter referred to as the transfer motor, which, as best shown in Fig. 3 of the drawings, drives a single revolution clutch 71 through a chain 72 trained around a sprocket 73 on the motor shaft and a sprocket, not shown, connected to the clutch. The clutch 71 is controlled by a pivoted latch 75 which engages an element 76 of the clutch to disengage it, the latch 75 being retractable out of engagement with the element 76 by a solenoid 77 which is controlled in a manner to be described. Thus, each time the solenoid 77 is energized momentarily, the latch 75 is retracted to release the element 76, whereupon the clutch rotates a shaft 78, Fig. 2, through one revolution, the latch 75 dropping into position to re-engage the element 76 when the solenoid is de-energized to limit the shaft to one revolution for each momentary energization of the solenoid.

Fixed on the shaft 78 is a sprocket 81 around which is trained a chain 82, the latter also being trained around an input sprocket 83 on the gear box 50. Thus, the transfer motor 70 drives the escapement means 15 through the single revolution clutch 71 in the manner just described.

Also fixed on the shaft 78 is an eccentric sprocket 86 having trained therearound a chain 87, the latter also being trained around idling sprockets 88 and 89 and around a sprocket 90 fixed on a shaft 91. The idling sprocket 89 is mounted on a pivoted arm 92 so that this sprocket is free to swing to keep the chain 87 tight as the eccentric sprocket 86 rotates. Also fixed on the shaft 91 is a sprocket 95 around which is trained a chain 96, the latter also being trained around a sprocket 97 on the shaft 65 carrying the sprocket 63 for driving the chain 62 of the transfer means 16. Thus, the sweep 61 of the transfer means is driven by the transfer motor 70 through the single revolution clutch 71, the eccentric sprocket 86 and the other associated elements just described.

The position of the eccentric sprocket 86 during each revolution thereof is so related to the position of the sweep 61 during each cycle thereof that the sweep 61 moves relatively slowly as it engages a pan strap which has been passed by the escapement means 15 and which is to be transferred to the loader conveyor 17. Thus, the sweep 61 engages the pan strap with a minimum of jarring to prevent damage to the raised dough in the pan straps. Thereafter, as the eccentric sprocket continues to rotate, it accelerates the sweep 61 to transfer the pan strap to the loaded conveyor 17 in a minimum length of time, thereby clearing the decks rapidly so that another, following pan strap may be delivered to the transfer means by the escapement means 15 in a minimum length of time. It will be noted that a bumper 98 stops each pan strap as it is passed by the escapement means 15 and is conveyed into position to be engaged by the sweep 61.

It will be noted that both the escapement means 15 and the transfer means 16 are driven by the transfer motor 70 through the single revolution clutch 71. Consequently, the escapement means 15 and the transfer means 16 operate in timed relation, which is an important feature.

Various features of the structure illustrated in Figs. 2 and 3 of the drawings of this application and hereinbefore described are claimed in the previously identified parent application of which this application is a continuation-in-part.

Considering the loader conveyor 17 in detail, it includes, as best shown in Fig. 1 of the drawings, an upstream section 101 and a downstream section 102, the former receiving at least approximately uniformly spaced pan straps from the escapement means 15 and transfer means 16 and delivering them to the latter, or downstream section. The downstream section 102 of the loader conveyor 17 is positioned in front of and extends transversely of the baking oven 11 so that a group of spaced pan straps, accurately spaced apart by the spacing means 19, may be loaded into the oven by the loader 20 in the form of a rank of accurately spaced pan straps extending transversely of the oven.

Figure 4:
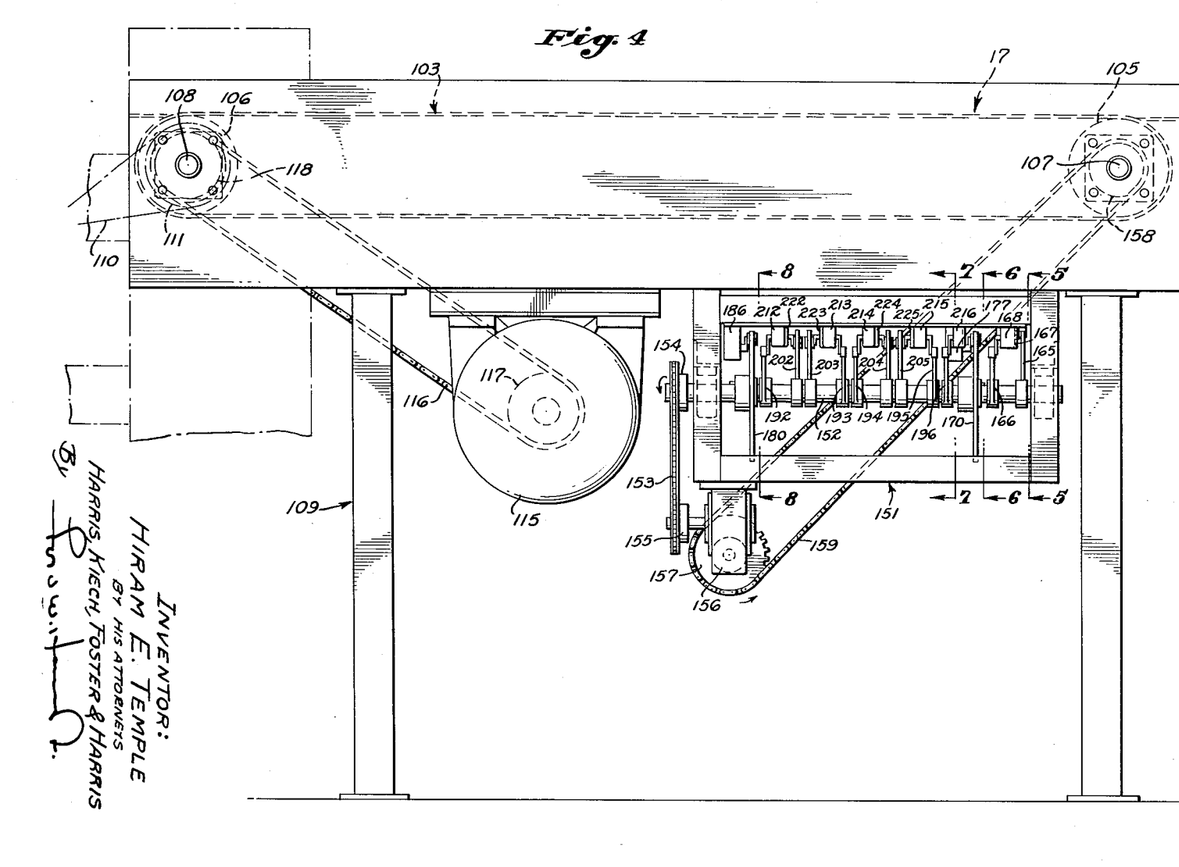
Fig. 4 is an enlarged, fragmentary elevational view taken as indicated by the arrowed line 4—4 of Fig. 1.

As best shown in Fig. 1 of the drawings, the conveyor section 101 includes two endless conveying elements 103 upon which the pan straps rest, and the conveyor section 102 similarly includes two endless conveying elements 104. Referring to Fig. 4 of the drawings, the conveying elements 103 are trained around sprockets 105 and 106 respectively fixed on shafts 107 and 108 carried by a frame 109. The conveying elements 104 of the conveyor section 102 are similarly trained around sprockets which are not shown, the conveyor section 102 being driven by the conveyor section 101 through a chain 110, Fig. 4, which is trained around a sprocket 111 fixed on the shaft 108 of the conveyor section 101 and which is trained around a corresponding sprocket, not shown, of the conveyor section 102. Thus, the conveyor sections 101 and 102 operate in timed relation, the conveyor section 101, which drives the conveyor section 102, being driven by a loader conveyor motor 115, Fig. 4, through a chain 116 trained around a sprocket 117 on the motor shaft and around a sprocket 118 on the shaft 108. Thus, the loader conveyor motor 115 drives both sections 101 and 102 of the loader conveyor 17.

Referring back to Fig. 1 of the drawings, the spacing means 19 is adapted to space apart pan straps of two different sizes and thus includes two sets of stops or stop devices, the stop devices of one set being identified by the numerals 121, 122, 123, 124, 125 and 126, and the stops or stop devices of the other set being identified by the numerals 121, 132, 133, 134 and 135. While two sets of stop devices respectively including six and five stops have been disclosed, it will be understood that any desired number of sets of stop devices each including any desired number of stops may be employed.

The stop 121 is preferably a fixed stop located adjacent the downstream end of the loader conveyor section 102 so that it intercepts the first pan strap in each group of pan straps delivered to this loader conveyor section, the manner in which groups of pan straps are delivered to the loader conveyor section 102 being discussed hereinafter. The remaining stops, i. e., the stops 122 to 126 and 132 to 135, are movable between extended and retracted positions, these stops, when in their extended positions, projecting upwardly above the upper surfaces of the conveying elements 104 to intercept pan straps on said conveying elements, and, when in their retracted positions, being below the upper surfaces of such conveying elements to permit the pan straps to be conveyed toward the downstream end of the loader conveyor section 102 by the conveying elements 104.

Figure 9:
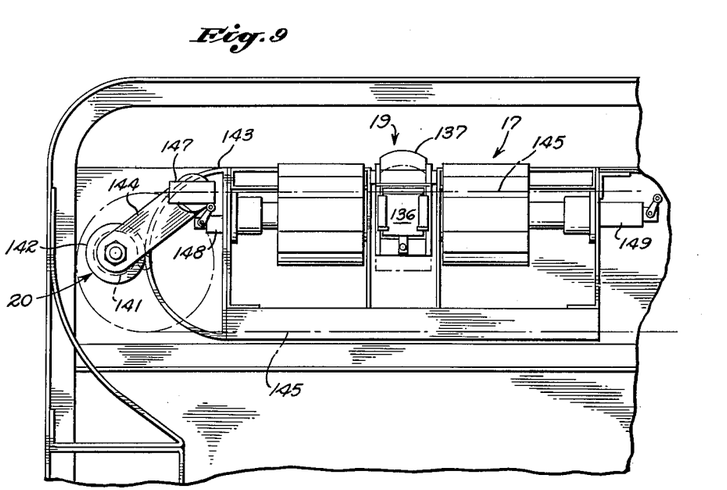
Fig. 9 is an enlarged, fragmentary sectional view taken along the arrowed line 9—9 of Fig. 1.

As best shown in Fig. 9 of the drawings, wherein the movable stop 126 is illustrated, each movable stop is preferably electrically operated and is illustrated as comprising a solenoid 136 having an armature which carries a stop element 137, such stop element being extended upwardly into the path of pan straps on the loader conveyor section 102 when its solenoid is energized. The other movable stops are identical in construction.

Before considering the manner in which the movable stops 122 to 126 and 132 to 135 are energized, it is convenient to consider the loader 20 for loading a rank of pan straps accurately spaced apart by the stops 121 to 126, or by the stops 121 and 132 to 135, into the oven 11. The loader 20 may be similar to that disclosed in my Patent No. 2,561,542, issued July 24, 1951. Briefly the loader 20, Fig. 9, comprises a sweep bar 141 which is carried by rollers 142 at its ends, the rollers being movable along tracks 143. Connected to the ends of the sweep bar 141 are pivoted arms 144 which connect the sweep bar to chains 145 suitably driven by a loader motor 146, Fig. 10. Carried by one of the chains 145 is a switch actuator 147 which is adapted to actuate a limit switch 148 for stopping the sweep bar 141 in a rest position and which is also adapted to actuate a switch 149 for starting the loader conveyor motor 115 after the sweep bar has crossed the loader conveyor section 102, all as will be discussed in detail hereinafter.

Thus, as will be apparent, each time the loader motor 146 is energized, the sweep bar 141 moves across the loader conveyor section 102 toward the oven 11 so as to transfer into the oven a rank of pan straps accurately spaced apart on the loader conveyor section 102 by either the stops 121 to 126 or the stops 121 and 132 to 135, depending on which set of stops is in operation, and therefore depending on the size of the pan straps being handled.

Referring to Fig. 4 of the drawings, the conveyor system of the invention includes a timing means or timing unit 151 which controls the operation of the escapement means 15, the transfer means 16, the loader conveyor 17, the spacing means 19 and the loader 20 so that all of these elements operate in timed relation. The timing unit 151 includes a camshaft 152 carried by suitable bearings on the frame 109. The camshaft 152 is driven through a chain 153 trained around a sprocket 154 fixed thereon and around a sprocket 155 on the output shaft of a gear box 156. The input shaft of the gear box has fixed thereon a sprocket 157 which is driven by a sprocket 158 on the shaft 107 of the loader conveyor section 101 through a chain 159.

Fixed on the camshaft 152 are several switch-actuating cams whose functions will be considered in detail hereinafter when considering the operation of the conveyor system of the invention in conjunction with the circuit of Fig. 10 of the drawings. For the time being, these cams will merely be assigned reference numerals and their functions will merely be indicated generally.

Figure 5:
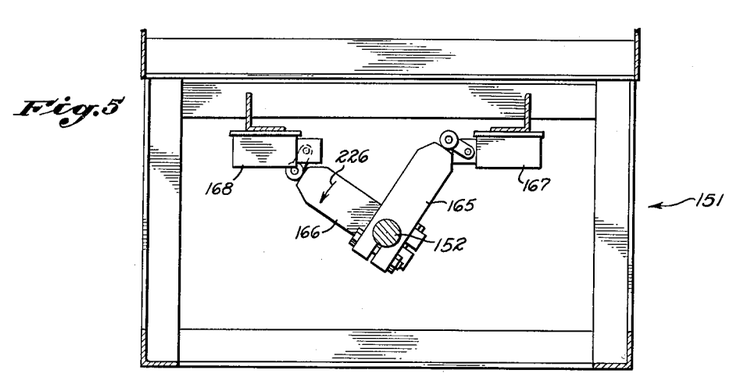
Figs. 5, 6, 7 and 8 are enlarged, fragmentary, sectional views respectively taken as indicated by the arrowed lines 5—5, 6—6, 7—7 and 8—8 of Fig. 4.
Figure 6:
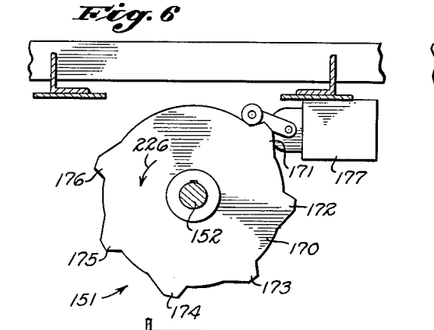

Referring to Figs. 4 and 5 of the drawings, fixed on the camshaft 152 are cams 165 and 166 for actuating switches 167 and 168, respectively, the cam 165 being adapted to open the switch 167 and the cam 166 being adapted to close the switch 168. Referring to Figs. 4 and 6 of the drawings, fixed on the camshaft 152 is a cam 170 having, in the particular construction illustrated, six lobes 171 to 176 each adapted to close a switch 177 controlling the solenoid 77 for energizing the single revolution clutch 71 discussed previously. The lobes 171 to 176 are spaced uniformly around the periphery of the cam 170, but there is a greater spacing between the lobes 171 and 176. The cam 170 corresponds to the group of stops or stop devices 121 to 126 and is adapted to feed a group of six pan straps to the spacing means 19.

Figure 8:
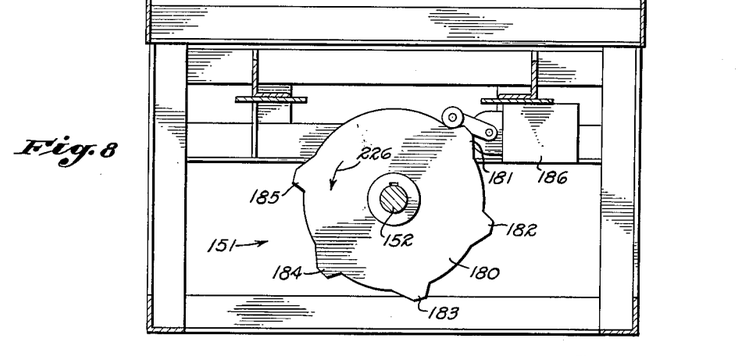

Referring to Figs. 4 and 8, also fixed on the camshaft 152 is a similar cam 180 having lobes 181 to 185 each adapted to close a switch 186 controlling the clutch-engaging solenoid 77. The lobes 181 to 185 are spaced apart uniformly around the periphery of the cam 180, but the lobes 181 and 185 are spaced apart a great distance. This cam, i. e., the cam 180, corresponds to the set of stops or stop devices 121 and 132 to 135.

Figure 7:
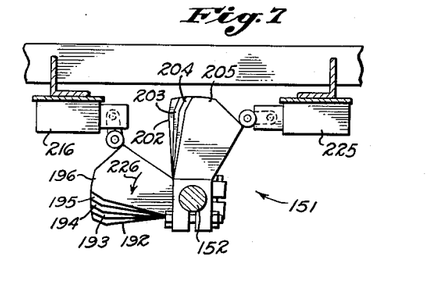

Referring particularly to Figs. 4 and 7, mounted on the camshaft 152 are cams 192 to 196 respectively corresponding to the stops 122 to 126 and cams 202 to 205 respectively corresponding to the stops 132 to 135. The cams 192 to 196 are adapted to close switches 212 to 216, respectively, these switches being connected in series with the stops 122 to 126, respectively, as shown in Fig. 10. Similarly, the cams 202 to 205 are adapted to close switches 222 to 225, respectively, these switches being connected in series with the stops 132 to 135, respectively, as shown in Fig. 10. The leading edges of the cams 192 to 196 are staggered circumferentially so that the switches 212 to 216 are closed seriatim to energize the stops 122 to 126 seriatim, the direction of rotation of the camshaft being as indicated by the arrows 226 in Figs. 5 to 8. Similarly, the leading edges of the cams 202 to 205 are staggered circumferentially so as to close the switches 222 to 225 seriatim, thereby energizing the stops 132 to 135 sequentially.

Figure 10:
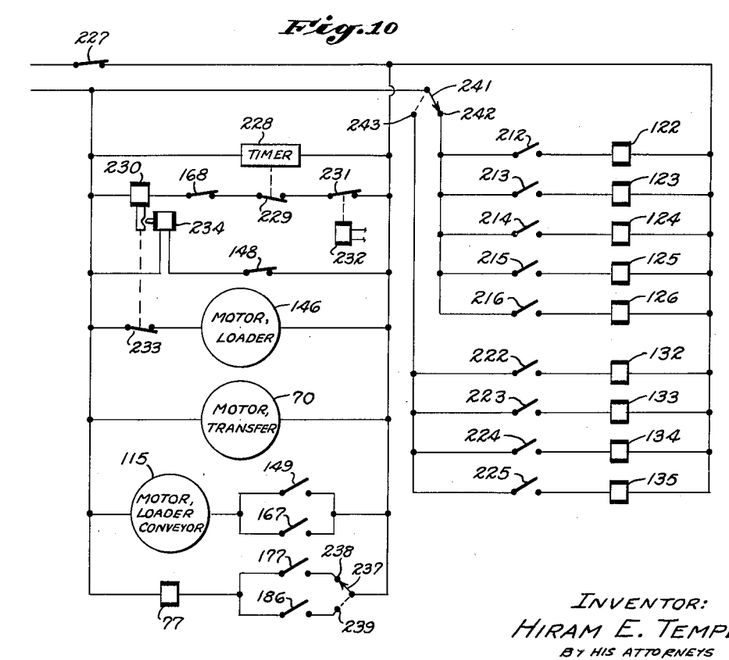
Fig. 10 is a diagrammatic view of an electrical circuit of the conveyor system of the invention.

Turning now to Fig. 10 of the drawings, the circuit illustrated therein includes a master switch 227, as is conventional. Connected in series with the master switch 227 is a pulse timer 228 which periodically and momentarily closes a switch 229. For example, the timer 228 may close the switch 229 for periods of one second each. The length of the intervals between closures of the switch 229 by the timer 228 depend on the speed of the conveyor means of the oven 11. In other words, if the conveyor means of the oven is capable of receiving a rank of pan straps every 10 seconds, the timer 228 is set to close the switch 229 momentarily every 10 seconds.

A relay 230 is connected in series with the switch 229 and the switch 168 so that both of these switches must be closed before the relay 230 is energized, this relay controlling the loader motor 146 in a manner to be described. Also connected in series with the relay 230 is a switch 231 controlled by a relay 232 which is connected in the circuit, not shown, of the conveyor means of the oven 11 so that the relay 232 is energized to close the switch 231 so long as the conveyor means of the oven is in operation. Consequently, if the conveyor means of the oven 11 stops, the relay 230 cannot be energized to start the loader motor 146.

The relay 230, when energized, closes a switch 233 which is in series with the loader motor 146, whereby the latter is energized each time the relay 230 is energized. The relay 230 is of the mechanically held type and is released by energization of an auxiliary solenoid 234 which is connected in series with the switch 148. The transfer motor 70 is continuously operating so that it is merely connected in series with the master switch 227. The loader conveyor motor 115 is connected in series with the master switch 227 through the switches 149 and 167, the latter being connected in parallel with respect to each other. The solenoid 77 controlling the single revolution clutch 71 driven by the transfer motor 70 may be connected in the circuit by either the switch 177 or the switch 186, the former being actuated by the six-lobe cam 170 and the latter being actuated by the five-lobe cam 180 as previously described. A selector switch 237 determines which one of the switches 177 and 186 is placed in operation, the selector switch 237 being moved into engagement with a contact 238 if ranks of six pan straps are to be loaded into the oven 11, and being moved into engagement with a contact 239 if ranks of five pan straps are to be loaded into the oven. Another selector switch 241 is provided to connect either the stop devices 122 to 126, or the stop devices 132 to 135, in the circuit. If ranks of six pan straps are to be loaded into the oven 11, the selector switch 241 is moved into engagement with a contact 242 to activate the stop devices 122 to 126. Otherwise, the selector switch 241 is moved into engagement with a contact 243 to activate the stop devices 132 to 135.

In considering the operation of the conveyor system of the invention, it will be assumed that the system is to load ranks of six spaced pan straps into the oven 11, in which case the selector switches 237 and 241 are in the positions shown, i. e., are in engagement with the contacts 238 and 242, respectively. The operation of the invention when ranks of five spaced pan straps are being loaded into the oven is substantially identical and will not be considered hereinafter.

For a starting point in considering the operation of the conveyor system of the invention, it will be assumed that the various components are in the positions shown in the drawings. Under such conditions, a rank of six accurately spaced pan straps is on the loader conveyor section 101 in front of the oven 11 in readiness for loading into the oven. The stops 121 to 126 have spaced the six pan straps apart accurately and the cams 192 to 196 have disengaged the switches 212 to 216 to de-energize the movable stops 122 to 126, which are retracted. The conveyor means of the oven 11 has advanced sufficiently far to receive the rank of pan straps, so that the timer 228 has closed the switch 229. Since the conveyor means of the oven is in operation, the relay 232 holds the switch 231 closed and, since the cam 166 is in engagement with the switch 168, this switch is also closed. Therefore, the relay 230 controlling the switch 233 in series with the loader motor 146 is energized to energize the loader motor. The transfer motor 70, of course, operates continuously. The loader conveyor motor 115 is de-energized since the switch 149 is open and since the switch 167 is held open by the cam 165, with the result that the loader conveyor 17 is stationary. The loader conveyor 17, of course, controls the timing unit 151 so that the camshaft 152 is stationary. The switches 177 and 186 controlling the clutch engaging solenoid 77 are open so that the escapement means 15 and the transfer means 16 are idle.

With the foregoing conditions obtaining, as soon as the sweep bar 141 is moved slightly from the position as shown in Fig. 9, the switch 148 opens to de-energize the solenoid 234, whereupon this solenoid latches the relay 230 to hold the switch 233 controlling the loader motor 146 closed. Consequently, when the timer 228 reopens the switch 229 controlled thereby, the loader motor 146 continues to operate until it completes one cycle. As will be apparent, as the loader motor 146 moves the sweep bar 141 along its path, the sweep bar loads the rank of six spaced pan straps into the oven 11. When the sweep bar returns to its rest position, shown in Fig. 9 of the drawings, the switch actuator 147 associated therewith recloses the limit switch 148 to energize the solenoid 234, thereby unlatching the relay 230 and opening the switch 233 controlling the loader motor 146. Consequently, the sweep bar remains in its rest position until both the switches 168 and 229 are reclosed.

As the sweep bar 141 crossed the loader conveyor section 102 and swept the six spaced pan straps therefrom into the oven 11, the switch actuator 147 closed the switch 149 momentarily to start the loader conveyor motor 115. Starting of the loader conveyor 17 results in starting of the timing unit 151 so that the cam 166 disengages the switch 168 to open it and the cam 165 disengages the switch 167 to close it. Since the switch 167 is connected in series with the loader conveyor motor 115, this motor will continue to operate until the camshaft completes a full revolution and returns to the position shown in Fig. 5 of the drawings. Similarly, the switch 168 will remain open until the camshaft 152 completes one full revolution, so that, when the relay 230 is unlatched by the solenoid 234 upon closure of the limit switch 148, the sweep bar will remain in its rest position, as discussed above, until both the switches 168 and 229 are reclosed.

As soon as the camshaft 152 starts to rotate, the lobe 171 of the cam 170 closes the switch 177 momentarily to energize the solenoid 77 momentarily, thereby actuating the escapement means 15 and the transfer means 16 once to pass one strap and transfer it to the loader conveyor 17, which, as indicated above, began operating concurrently with the timing unit 151. Continued rotation of the camshaft 152 results in closure of the switch 177 momentarily by the lobe 172 of the cam 170 to cause the escapement means 15 to pass another pan strap to the transfer means 16, which transfers it to the loader conveyor 17. The second pan strap in the group is spaced from the first because of the action of the driven rolls 27 of the downstream section 18 of the inlet conveyor 14, as previously described. Continued rotation of the cam 170 results in the release and transfer of additional pan straps as the lobes 173, 174, 175 and 176 of the cam 170 actuate the switch 177. Thus, by the time the lobe 176 of the cam 170 has cleared the switch 177, a file of at least approximately uniformly spaced pan straps is moving down the loader conveyor 17, there being six pan straps in the file with the six-lobe cam 170 in use. Thereafter, no further pan straps are released and transferred to the loader conveyor until the next cycle.

In the event that no pan strap is bearing against the gate 40 when the switch 177 is actuated by one of the lobes 171 to 176, the gate will not move to its retracted position and a gap will be produced in the file of pan straps moving down the loader conveyor 17. However, the remaining pan straps in the file, i. e., the pan straps actually in the file, are still at least approximately uniformly spaced from each other, except for the gap produced by the missing pan strap. Thus, even though one or more gaps may appear in each file of pan straps delivered to the loader conveyor 17, the pan straps actually delivered are still in their proper positions, which is an important feature.

About the time that the first pan strap in the file on the loader conveyor 17 reaches the fixed stop 121, the cam 192 closes the switch 212 to energize the stop 122. Consequently, the stop 122 is extended to intercept the second pan strap in the file so as to accurately space it from the first. Similarly, about the time the second pan strap is intercepted by the stop 122, the cam 193 engages the switch 213 to extend the stop 123, which intercepts the third pan strap. The cams 194 to 196 continue to engage the switches 214 to 216 sequentially to extend the stops 124 to 126 sequentially at the proper instants to intercept the fourth, fifth and sixth pan straps, respectively. Thus, the six pan straps are all accurately spaced apart along the section 102 of the loader conveyor 17 in front of the oven 11.

If there are any gaps in the file of pan straps on the loader conveyor 17, the corresponding stops will not intercept any pan straps, but the remaining stops will. In other words, if the first pan strap in the file is missing, the first pan strap actually present will be intercepted by the second stop 122. Similar considerations are applicable for gaps in other positions in the file.

After all of the pan straps have ben positioned on the conveyor section 102 in the foregoing manner by the stops 122 to 126, the cam 165 engages the switch 167 to open it, thereby stopping the loader conveyor motor 115 and stopping the loader conveyor 17. Also, the cams 192 to 196 disengage the switches 212 to 216 to permit the stops 122 to 126 to retract preparatory to sweeping the rank of pan straps into the oven with the sweep bar 141. At about the same time, the switch 168 is closed by the cam 166 to prepare the relay 230 for energization upon the next closure of the switch 229 by the timer 228. Thus, one complete cycle of the operation of the conveyor system of the invention has been described.

As previously indicated, the operation of the conveyor system of the invention with the cam 180 in operation is substantially identical and will not be described in detail. All that is necessary to place the cam 180 in operation when it is desired to form ranks of five pan straps, instead of six pan straps, is to move the selector switch 237 to the contact 239 and the selector switch 241 to the contact 243. In all other respects, the operation is identical.

Thus, the present invention provides an apparatus for first producing at least an approximately uniform spacing of articles on a conveyor, and for thereafter precisely spacing the articles apart on the conveyor. Also, the operation of the system is not affected by missing articles since the only effect of a missing article is to produce a gap in the rank of pan straps spaced apart by the spacing means 19, the remaining articles in the rank occupying the same positions as they would occupy if all of the positions in the rank were completely filled.

Although I have disclosed an exemplary embodiment of my invention herein for purposes of illustration, it will be understood that various changes, modifications and substitutions may be incorporated therein without departing from the spirit of the invention.

I claim as my invention:

1. In a conveyor system, the combination of: a conveyor; means for delivering a series of spaced articles to said conveyor; a plurality of stops spaced apart along said conveyor and movable from retracted to extended positions to intercept the respective articles in the series at spaced points along said conveyor; and cam means operatively connected to said stops and operating in timed relation with said conveyor for extending said stops seriatim and retaining said stops in extended position until all of said stops are in extended position whereby to retain said series of articles in spaced relation on said conveyor.

2. In a conveyor system, the combination of: a conveyor; means for delivering a series of spaced articles to said conveyor; a plurality of stops spaced apart along said conveyor and movable from retracted to extended positions to intercept the respective articles in the series; a plurality of electrical devices respectively connected to said stops for extending same; a plurality of switches respectively connected to said electrical devices and actuable to cause said electrical devices to extend said stops, respectively; and cam means engageable with said switches and operating in timed relation with said conveyor for actuating said switches seriatim so as to cause said stops to be extended seriatim.

3. In a conveyor system, the combination of: a conveyor; means for delivering a series of spaced articles to said conveyor; a plurality of solenoids spaced apart along said conveyor, the armatures of said solenoids being extendable upon energization of said solenoids to intercept the respective articles in the series; a plurality of switches respectively connected to said solenoids and closeable to energize said solenoids; and cam means operating in timed relation with said conveyor and engageable with said switches seriatim for energizing said solenoids seriatim.

4. A conveyor system as defined in claim 1 including means for transferring laterally from said conveyor a series of articles intercepted by said stops, and including means operating in timed relation with said conveyor for actuating said transferring means.

5. A conveyor system according to claim 4 wherein said stops and said transferring means are electrically operable and wherein the two means operating in timed relation with said conveyor respectively comprise cam means engageable with switches respectively connected to said stops and said transferring means.

6. In a conveyor system, the combination of: a conveyor; means for delivering articles one at a time and in spaced relation to said conveyor so as to produce a series of spaced articles on said conveyor; a plurality of stops spaced apart along said conveyor and movable from retracted to extended positions to intercept the respective articles in the series; means operating in timed relation with said conveyor for extending said stops seriatim; and another means operating in timed relation with said conveyor for periodically energizing said article-delivering means a number of times equal to the number of articles desired in said series.

7. A conveyor system according to claim 6 wherein said article-delivering means and said stops are electrically operable and wherein the two means operating in timed relation with said conveyor respectively comprise cam means engageable with switches respectively connected to said article-delivering means and said stops.

8. In a conveyor system, the combination of: a conveyor; means for delivering articles one at a time and in spaced relation to said conveyor so as to produce a series of spaced articles on said conveyor; and means operating in timed relation with said conveyor for periodically energizing said article-delivering means a number of times equal to the number of articles desired in said series.

9. A conveyor system according to claim 8 wherein the means operating in timed relation with said conveyor includes cam means for periodically actuating a switch connected to said article-delivering means, the latter being electrically operated.

10. A conveyor system according to claim 6 including means for transferring laterally from said conveyor a series of articles intercepted by said stops, and including means operating in timed relation with said conveyor for energizing said transferring means when a series of articles has been intercepted by said stops.

11. A conveyor system according to claim 10 wherein said stops, said article-delivering means and said transferring means are electrically operable and wherein the three means operating in timed relation with said conveyor respectively comprise cam means respectively engageable with switches connected to said stops, said article-delivering means and said transfer means.

12. In a conveyor system, the combination of: an inlet conveyor having upstream and downstream sections; means connected to said sections for driving said downstream section at a higher speed than said upstream section; escapement means in the path of said downstream section for passing one article at a time, said downstream section spacing each article passed by said escapement means from a following article; actuating means operatively connected to said escapement means for operating same; an outlet conveyor having its upstream end communicating with the downstream end of said inlet conveyor to receive therefrom spaced articles passed by said escapement means; a plurality of stops spaced apart along said outlet conveyor and movable from retracted to extended positions to intercept the respective articles in a series passed by said escapement means; means operating in timed relation with said outlet conveyor for extending said stops seriatim; and means operating in timed relation with said outlet conveyor for periodically energizing said actuating means for said escapement means a number of times equal to the number of articles desired in said series.

13. A conveyor system according to claim 12 in which said stops and said actuating means are electrically operable and in which the two means operating in timed relation with said outlet conveyor respectively comprise cam means engageable with switches respectively connected to said stops and said actuating means.

14. In a conveyor system, the combination of: a conveyor; escapement means for passing an article at a time to said conveyor; actuating means operatively connected to said escapement means for operating same; means for spacing apart the articles passed by said escapement means; a plurality of stops spaced apart along said conveyor and movable from retracted to extended positions to intercept the respective articles in a series passed to said conveyor by said escapement means; means operating in timed relation with said conveyor for extending said stops seriatim; and means operating in timed relation with said conveyor for energizing said actuating means periodically a predetermined number of times equal to the number of articles desired in said series.

15. A conveyor system according to claim 14 including means for transferring laterally from said conveyor a series of articles intercepted by said stops, and including means operating in timed relation with said conveyor for energizing said transferring means.

16. A conveyor system according to claim 15 wherein said actuating means, said stops and said transferring means are electrically operable and wherein the three means operating in timed relation with said conveyor respectively comprise cam means engageable with switches respectively connected to said actuating means, said stops and said transferring means.

References Cited in the file of this patent

UNITED STATES PATENTS

| | | |
|---|---|---|
| 1,845,051 | Latham | Feb. 16, 1932 |
| 2,549,341 | Sperling | Apr. 17, 1951 |
| 2,576,369 | Sticelber | Nov. 27, 1951 |
| 2,595,022 | Temple | Apr. 29, 1952 |